(12) United States Patent
Sheets

(10) Patent No.: US 7,059,438 B1
(45) Date of Patent: Jun. 13, 2006

(54) ATV WITH AN IMPROVED TRANSMISSION AND AIR INTAKE

(76) Inventor: Wilbert J. Sheets, 525 N. Pleasant Ave., Gonzales, LA (US) 70737

( * ) Notice: Subject to any disclaimer, the term of this patent is extended or adjusted under 35 U.S.C. 154(b) by 475 days.

(21) Appl. No.: 10/632,520

(22) Filed: Aug. 1, 2003

Related U.S. Application Data

(60) Provisional application No. 60/400,496, filed on Aug. 1, 2002.

(51) Int. Cl.
*B60K 11/00* (2006.01)

(52) U.S. Cl. .................. 180/68.1; 180/68.2; 474/93

(58) Field of Classification Search ............. 180/68.1, 180/68.2; 123/41.48, 41.31, 41.56; 474/93; 137/519
See application file for complete search history.

(56) References Cited

U.S. PATENT DOCUMENTS

| | | | |
|---|---|---|---|
| 653,885 A | 7/1900 | Richards | |
| 1,788,992 A | 1/1931 | Ecabert | |
| 1,903,120 A | 3/1933 | Lafferty | |
| 2,657,705 A | 11/1953 | Gerhard et al. | |
| 3,060,882 A | 10/1962 | Peters et al. | |
| 3,307,336 A | 3/1967 | Dewsberry | |
| 4,497,285 A * | 2/1985 | Kondo | 123/41.65 |
| 4,519,473 A * | 5/1985 | Ochiai et al. | 180/229 |
| 4,697,665 A | 10/1987 | Eastman et al. | |
| 4,712,629 A * | 12/1987 | Takahashi et al. | 180/68.1 |
| 4,744,432 A * | 5/1988 | Shibata et al. | 180/68.1 |
| 4,870,992 A | 10/1989 | Irwin et al. | |
| 5,086,858 A * | 2/1992 | Mizuta et al. | 180/68.3 |
| 5,577,570 A * | 11/1996 | Shiohara et al. | 180/219 |
| 5,628,269 A * | 5/1997 | Henmi et al. | 114/183 R |
| 5,976,044 A * | 11/1999 | Kuyama | 474/93 |
| 6,622,806 B1 * | 9/2003 | Matsuura | 180/68.1 |
| 2003/0066696 A1 * | 4/2003 | Nakamura | 180/68.1 |

* cited by examiner

*Primary Examiner*—Tony Winner
(74) *Attorney, Agent, or Firm*—Garvey, Smith, Nehrbass & North, L.L.C.; Charles C. Garvey, Jr.

(57) ABSTRACT

A method and apparatus for continuously discharging inadvertently accumulated water from the automatic transmission housing and/or air filter housing of an all terrain vehicle is disclosed. The continuous water discharge system employs a one-way valve structure that is mounted at the lower end portion of either or both of the automatic transmission housing and air filter housing.

10 Claims, 3 Drawing Sheets

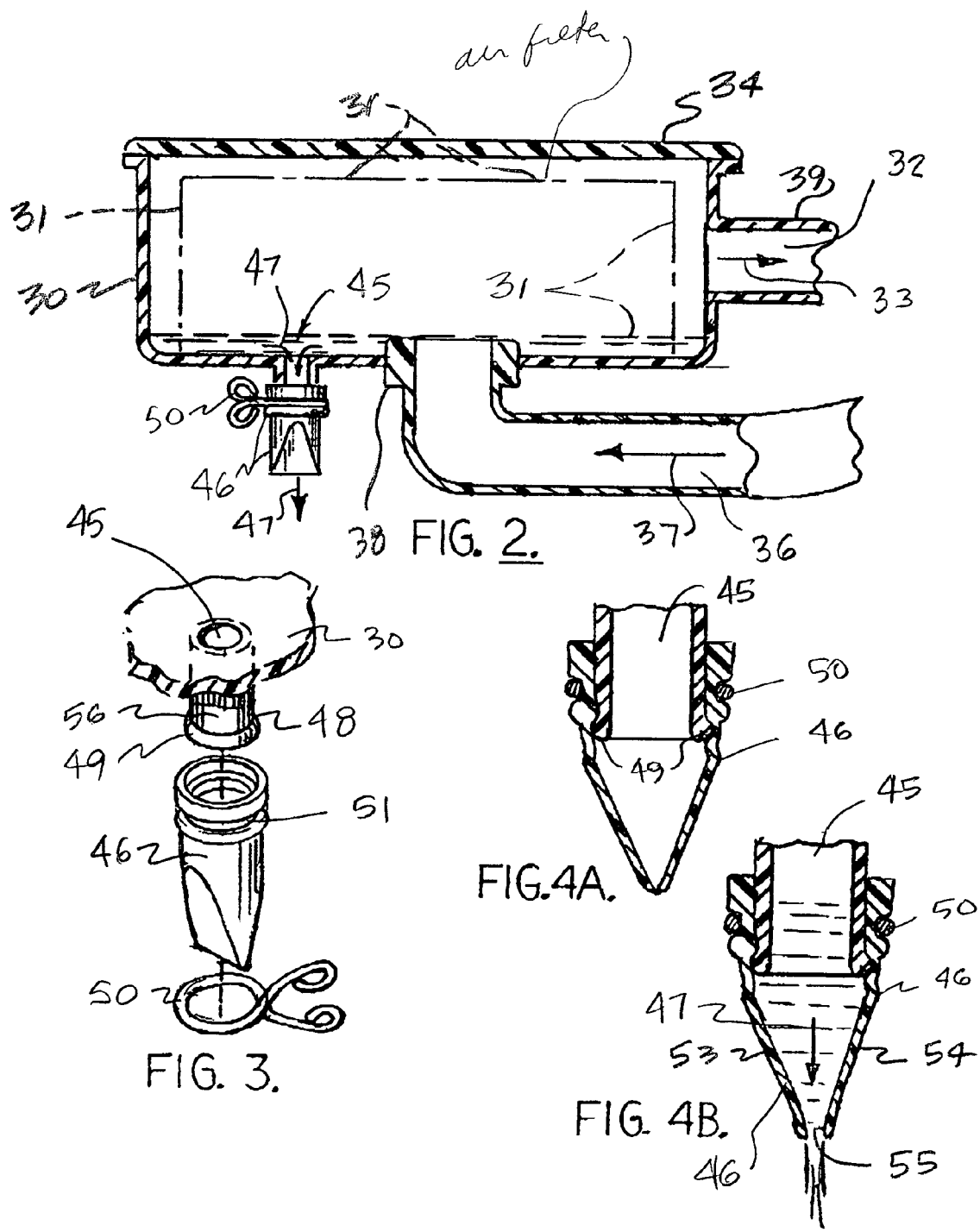

US 7,059,438 B1

ATV WITH AN IMPROVED TRANSMISSION AND AIR INTAKE

CROSS-REFERENCE TO RELATED APPLICATIONS

Priority of U.S. Provisional Patent Application Ser. No. 60/400,496, filed Aug. 1, 2002, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to all terrain vehicles. The present invention more particularly relates to an improved all terrain vehicle that can automatically eliminate water that might accumulate in the air filter housing or transmission housing when the vehicle is used in inundated areas.

2. General Background of the Invention

All terrain vehicles are used in many different types of terrain. Some of these vehicles are subjected to use in inundated areas such as rice fields, marshes, swamps, streams, river bottoms and the like. When used in such an environment, these vehicles (particularly those with automatic transmissions) inadvertently intake water than can find its way to the transmission housing and/or the air filter housing. In such a situation, the vehicle can become dangerous to operate and/or operable.

BRIEF SUMMARY OF THE INVENTION

The present invention solves these prior art problems and shortcomings by providing an all terrain vehicle that has an improved transmission housing and air intake housing arrangement that automatically drains any water that is inadvertently ingested.

In the preferred embodiment, the transmission housing and/or the air intake housing are provided with a valve that automatically discharges any water that might be inadvertently ingested, and while in use.

The present invention is directed to an improved all terrain vehicle that has a chassis, front and rear wheels, an engine mounted in between the front and rear wheels, a seat to be occupied by a driver during use, and handlebars for enabling the user to steer the two front wheels.

The apparatus includes an inclined intake conduit that has a forward air intake opening and a housing air intake that communicates air from the forward air inlet to the transmission housing for cooling purposes. Air is discharged from the transmission housing via an air discharge passageway. Both the forward air intake passageway and the rear air discharge passageways that communicate with the transmission housing are preferably inclined. The intake opening and discharge opening are each at the highest possible location to lessen the chance that they will make contact with a body of water such as a stream, pond, lake, flooded field, marsh, swamp or with splashing water.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a partially cut away fragmentary view of the preferred embodiment of the apparatus of the present invention;

FIG. 3 is a fragmentary perspective view of the preferred embodiment of the apparatus of the present invention;

FIGS. 4A and 4B are sectional fragmentary views illustrating the valve portion of the preferred embodiment of the apparatus of the present invention.

DETAILED DESCRIPTION OF THE INVENTION

Figure 1:
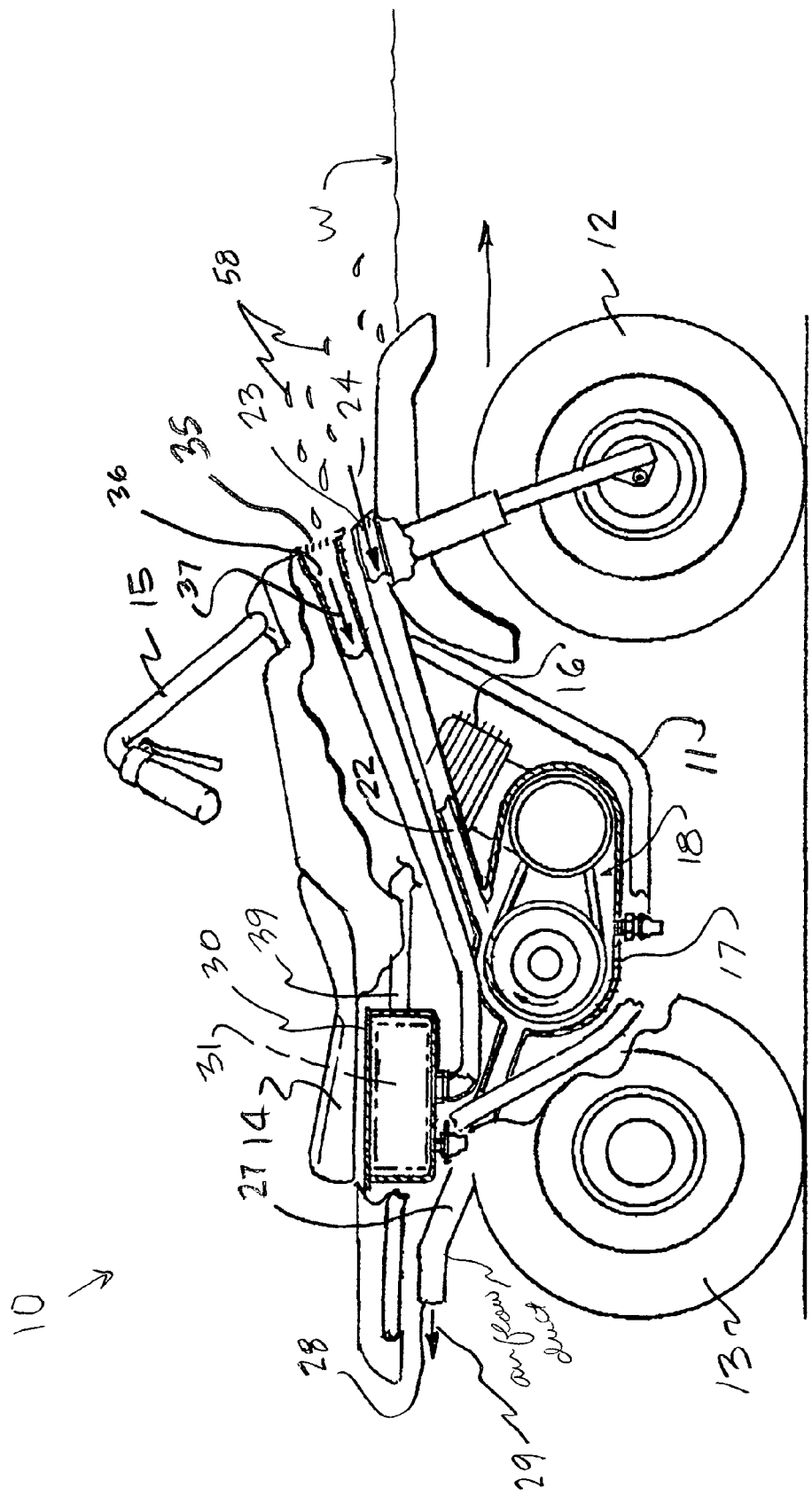
FIG. 1 is a partially cut away elevation view of the preferred embodiment of the apparatus of the present invention.

FIGS. 1–4B show the preferred embodiment of the apparatus of the present invention, designated generally by the numeral 10 in FIG. 1. All terrain vehicle 10 has a chassis 11 to which is mounted two front wheels 12 that are steerable wheels 12 and a pair of rear wheels 13. A seat 14 is positioned generally in between the front 12 and rear 13 wheels.

Handlebars 15 are mounted in front of seat 14 and enable an operator to steer the vehicle 10. An engine 16 is provided in between the front 12 and rear wheels 13 and generally below the seat 14. A transmission housing 17 is provided with a known automatic transmission that transfers power from engine 16 to rear wheels 13.

Figure 5:
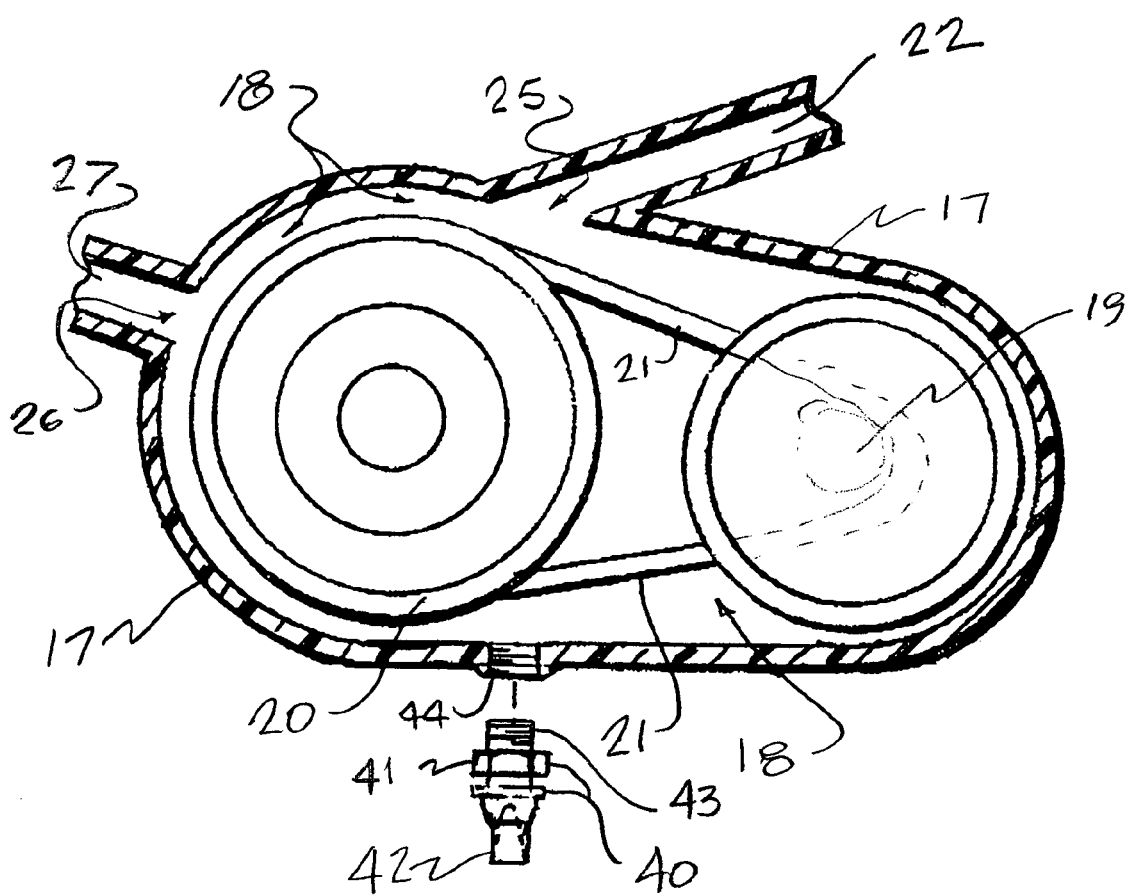
FIG. 5 is a partial sectional elevation view of the preferred embodiment of the apparatus of the present invention illustrating the valve and its connection to the transmission housing, and illustrating the air intake passageway and air discharge passageway that supply air for cooling purposes to the transmission housing.

Transmission housing 17 has interior 18. The known transmission includes pulleys and a belt 21 or belts. The pulleys can include forward pulley 19 and a rear pulley 20 as shown in FIGS. 1 and 5. Belt 21 connects pulleys 19, 20.

Transmission housing 17 interior 18 receives cooling air from lower air intake passageway 22. Air enters lower air intake passageway 22 through lower air intake opening 23 as indicated by arrow 24 in FIG. 1. Air intake 24 communicates with housing 17 interior 18 at housing air inlet 25. Air enters transmission housing 17 interior 18 for purposes of cooling the transmission parts that are contained in housing interior 18. These parts are known in the art and can include pulleys 19, 20 and belt 21.

Air that is leaving transmission housing 17 interior 18 discharge via housing air exhaust 27 and air discharge passageway 28. Arrow 29 schematically illustrates the exhaust of air that has traveled from intake 23 to housing interior 18 and then to rear air discharge opening 28.

Another air intake at 35 is an upper air intake opening that provides air for the engine 16 carburetor. Air that enters intake 35 travels in the direction of arrow 37 via upper air intake passageway 36 to fitting 38. In FIGS. 1 and 2, fitting 38 communicates air to air filter element 31 inside air filter housing 30 where the air is filtered before it is discharged in the direction of arrow 33 into carburetor air flow channel 32.

The carburetor air flow channel 32 is a bore of conduit 39 that connects air filter housing 30 with the carburetor of the engine 16.

The all terrain vehicle 10, fitted with the improvements disclosed herein, can be a commercially available all terrain vehicle that has an automatic transmission such as the Yamaha® Grizzly or Kodiak models, as examples. Generally speaking, these models have been available in the time frame of 1999–2002.

Yamaha® Grizzly and Yamaha® Kodiak models having automatic transmissions (as well as other all terrain vehicles that have automatic transmissions) have suffered from a water intake problem when they are used in inundated areas. This problem can affect users that traverse streams, lakes, ponds, rice fields and the like. When the vehicle enters a rice field having a water level W, water in the form of drops 58 or other splashed water can enter either or both of the intakes 23, 35 and be ingested by the apparatus 10. In such a situation, the water drains downwardly in the inclined passageways 22, 36 and can accumulate in either the interior 18 of transmission housing 17 or the interior of air cleaner housing 30.

Each of the housings 17, 31 is at an elevational position that is lower than or at the same level as the air intakes 23, 35 respectively. For example, in FIG. 1, air intake opening 23 is well above the interior 18 of automatic transmission housing 17. Similarly, the air intake 35 is preferably at an elevation above all or part of air filter housing 30.

In order to automatically and/or continuously remove water from either housing 17, 18 during use, a valve structure 40 or 46 can be employed. This valve is preferably a one way valve, check valve, flapper valve or like valve that removes water from the housing 17 interior 18 during use, i.e. while the user is riding upon or using the vehicle 10. Valve 40 that is attached to automatic transmission housing 17 is shown in FIG. 5. Valve structure 40 includes an upper section 41, lower section 42, and is threadably attached to an internally threaded opening 44 of housing 17. Upper section 41 of valve structure 40 provides external threads 43 that engage the internally threaded opening 44.

The lower valve structure 42 is preferably a rubber or polymeric flapper valve that is similar to the construction of valve 46 shown in FIGS. 3, 4A and 4B. The valves 40 and 46 each readily drain any water that collects above opening 44 or above opening 45 in FIG. 3. Water simply drains through the valve structure 40 or 46 via gravity. However, each valve 40 or 46 is a one way valve or check valve that disallows entry of water to the housing 40 or 46 via the valve 40 or 46. The lower valve element 42 and the valve member 46 can be of a rubber or polymeric construction and include, for example, a pair of opposed flat sections 53, 54 with a slotted opening 55 there between that opens when water accumulates above the flat sections 53, 54. Water thus empties via slotted opening 55 in the direction of arrow 47, as shown in FIGS. 2 and 4B.

At air cleaner housing 30, opening 45 communicates with drain fitting 48 having annular shoulder 49. Valve 46 has an annular groove 51 that receives hose clamp 50. Valve 46 is shown in FIGS. 4A and 4B attached to fitting 48. Hose clamp 50 attaches to annular groove 51 of valve 46 at a position above annular shoulder 49 of fitting 48.

Similarly, the lower valve section 42 has a structure as shown in FIG. 4B that continuously drains any water that accumulates in housing 17 above internally threaded opening 44. In FIG. 5, an externally threaded upper section 41 is provided for threading attachment to opening 44. In FIG. 2, a hose clamp 50 is provided for attaching valve 46 to an unthreaded, generally cylindrically shaped fitting 48.

PARTS LIST

The following is a list of suitable parts and materials for the various elements of the preferred embodiment of the present invention.

| PART NO. | DESCRIPTION |
|---|---|
| 10 | all terrain vehicle |
| 11 | chassis |
| 12 | front wheels |
| 13 | rear wheels |
| 14 | seat |
| 15 | handlebars |
| 16 | engine |
| 17 | transmission housing |
| 18 | interior |
| 19 | pulley |
| 20 | pulley |
| 21 | belt |
| 22 | lower air intake passageway |
| 23 | lower air intake opening |
| 24 | arrow |
| 25 | housing air inlet |
| 26 | housing air exhaust |
| 27 | air discharge passageway |
| 28 | rear air discharge opening |
| 29 | arrow |
| 30 | air filter housing |
| 31 | air filter element |
| 32 | carburetor air flow channel |
| 33 | arrow |
| 34 | housing cover |
| 35 | upper air intake opening |
| 36 | upper air intake passageway |
| 37 | arrow |
| 38 | fitting |
| 39 | conduit |
| 40 | valve |
| 41 | upper section |
| 42 | lower section |
| 43 | external threads |
| 44 | internally threaded opening |
| 45 | opening |
| 46 | valve |
| 47 | arrow |
| 48 | fitting |
| 49 | annular shoulder |
| 50 | hose clamp |
| 51 | annular groove |
| 52 | flexible section |
| 53 | flat section |
| 54 | flat section |
| 55 | slotted opening |
| 56 | |
| 57 | water level |
| 58 | water drops |

The foregoing embodiments are presented by way of example only; the scope of the present invention is to be limited only by the following claims.

The invention claimed is:

1. An all terrain vehicle comprising:
 a) a chassis;
 b) two front wheels that are steerable;
 c) two rear wheels;
 d) a seat that is positioned on the chassis generally above the rear wheels and in between the front and rear wheels;
 e) handlebars that are positioned in front of the seat for steering the front wheels;

f) an engine mounted to the chassis generally in between the front and rear wheels;
g) an automatic transmission that interfaces the engine with the rear wheels, the automatic transmission including at least a housing, a plurality of pulleys and a belt that engages the pulleys;
h) an air flow channel that intakes air to the transmission housing and that discharges air from the transmission housing for cooling the interior of the transmission housing; and
i) a valve mounted at the lower end of the transmission housing for draining, during use, any water than enters the transmission housing via the intake, wherein the intake is positioned at an elevation above at least a majority of the transmission housing interior.

2. The apparatus of claim 1 further comprising an air filter housing and an air intake conduit that communicates air to the air intake housing, the housing communicating with a carburetor that is attached to the engine and a valve that continuously drains any water that might accumulate within the air filter housing.

3. The apparatus of claim 1 or 2 wherein there are two separate air intake conduits, a first conduit that intakes air generally above the front wheels and communicates that air to the automatic transmission housing interior and a second air intake that is positioned generally above the front wheels for transferring air to the air filter housing.

4. The apparatus of claim 1 wherein the valve includes a flapper portion.

5. The apparatus of claim 1 wherein the valve is a one way valve.

6. The apparatus of claim 1 wherein the valve is a check valve.

7. The apparatus of claim 1 wherein water gravity drains from the housing through the valve.

8. The apparatus of claim 1 wherein at least part of the valve is of a polymeric material.

9. The apparatus of claim 1 wherein at least part of the valve is of a rubber material.

10. The apparatus of claim 1 wherein at least part of the valve is of a pliable material.

* * * * *